Dec. 23, 1952  A. VAN DUYN  2,622,938
SCALE
Filed May 28, 1948  2 SHEETS—SHEET 1
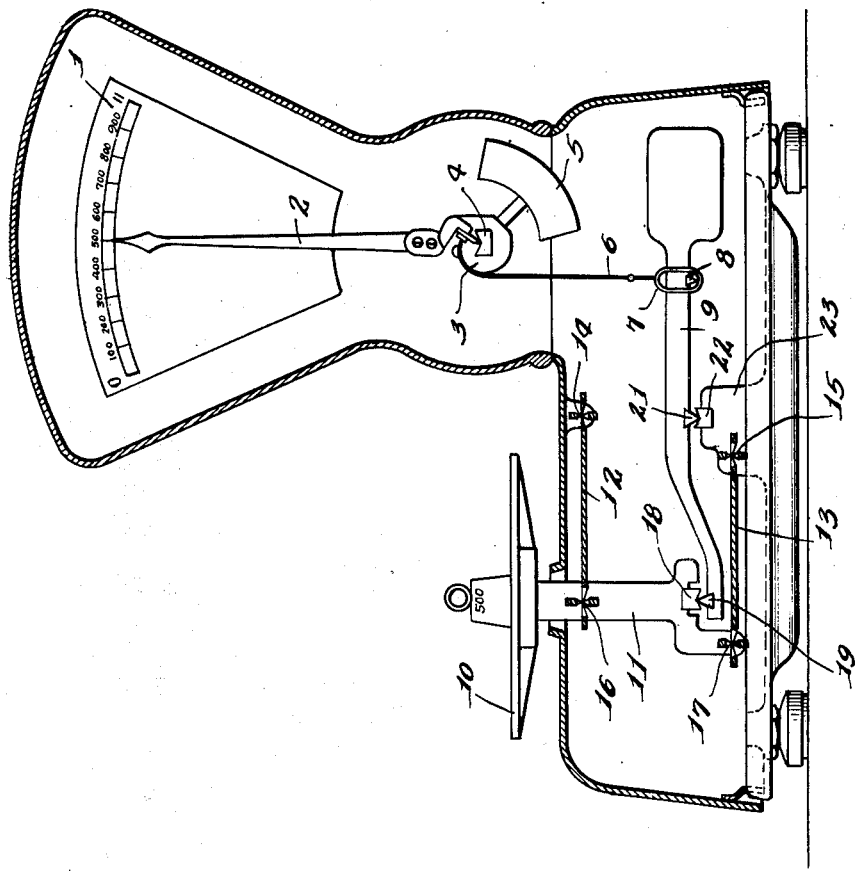
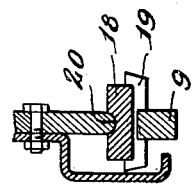
Inventor
Adrianus Van Duyn
By: Spencer, Margall, Johnston & Cook
Attys

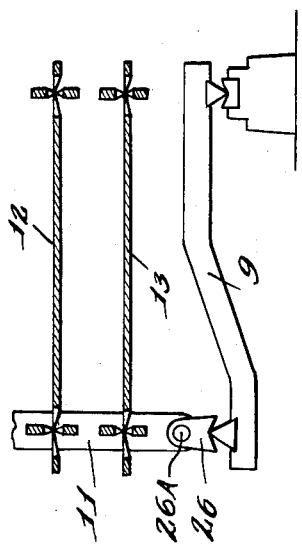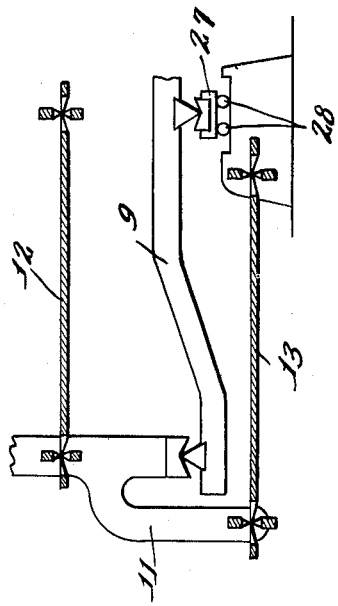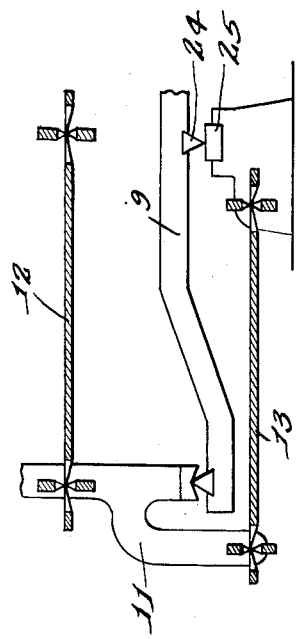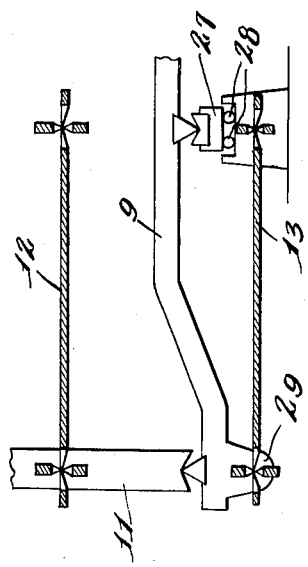

Patented Dec. 23, 1952

2,622,938

UNITED STATES PATENT OFFICE 2,622,938

SCALE

Adrianus van Duyn, Hillegersberg, Rotterdam, Netherlands, assignor to U. S. Slicing Machine Company, Inc., La Porte, Ind., a corporation of Indiana Application May 28, 1948, Serial No. 29,711
In the Netherlands June 5, 1947

4 Claims. (Cl. 308—2)

This invention relates to weighing apparatus of the type having a weighbeam, and a platter support carried by the weighbeam. More specifically, the invention relates to a scale of that type of weighing scale in which there is knife-edge bearing means providing for operative movement of the apparatus, and check-link means for controlling said operative movement.

A disadvantage arises in conventional scales when a load is placed at a position on the scale platter or platform other than at the center of the platter, because of inaccuracy in the finishing of the check-links, incorrect adjustment of the check-links, or the presence of play in the fulcrums thereof, whereupon a knife of the bearing means will become moved relative to its resting or true working position. As a consequence of such movement of the knife, the apparatus does not weigh properly, since the platter with its support will exercise a tilting movement about the pivotal mounting of the support on the weighbeam.

An important object of the present invention is to obviate the inherent disadvantages applicable to conventional weighing scales by the provision of new and improved adjustment means for maintaining a true working relationship between certain knife bearings and their cooperating rests, should corner loading of the scale platter occur.

Another important object is the provision of novel means, and an arrangement thereof, to overcome the occurrence of certain inaccuracies, or to provide compensating means in cases where inaccuracies in the check links tend to cause the knife bearings, and their associated knife bearing rests, to fall out of proper engagement with each other during operation of the weighing apparatus.

A further important object of the invention is to provide a weighbeam carrying knife-edged or V-shaped bearing members, one of said bearing members adapted to carry the load from the scale platform or platter and another of the said bearing members functioning as a fulcrum about which the weighbeam may have pivotal movement, and having means for adjustment of one of the bearing rests in a direction transverse to the axes of the knife-edged bearing members, so that the knife-edged bearing members and their respective cooperating rests will remain in true working relationship with each when the weighing apparatus is in operation.

Numerous other objects and advantages of the invention will be apparent throughout the progress of the following specification.

The accompanying drawings represent a selected embodiment of the invention and the views therein are as follows:

Fig. 1 is a sectional elevation of a weighing apparatus embodying the invention.

Fig. 2 is a detail sectional view of the adjustment means shown in Fig. 1, and

Figs. 3 to 6, inclusive, are diagrammatic views of four further embodiments of the invention.

The weighing apparatus herein shown for the purpose of illustrating the invention comprises a fan-shaped indication chart 1 over which a pointer 2 is displaceable. The pointer 2 is connected fixedly to a cam disc 3 which is mounted on a knife-edge bearing for rotation about an axis 4. A pendulum weight 5 is carried by the disc 3 to which a steel band 6 is arranged. The band 6 carries a link 7 at its lower end which engages a knife 8 on a weighbeam 9.

The usual platform or platter 10 is carried by a platform or platter support 11. A pair of check links 12 and 13 for the support 11 have fixed fulcrums at 14 and 15, respectively; these check links are pivotally connected to the platter support 11 at 16 and 17, respectively. (Fig. 6 shows the lower link 13 as being pivotally connected to the weighbeam 9 at 29.) The said fulcrums 14 through 17 consist of knives and knife rests.

A knife-edge bearing is provided at the lower end of the support 11. This bearing consists of knife rest 18, and corresponds with the knife 19 on the weighbeam 9, as shown in Fig. 1. An adjustment device consists of a lower rounded edge on the support 11 that is slidable in a corresponding groove 20 which is formed in the knife rest 18, as shown clearly in Fig. 2. The said rounded edge on the support 11 extends above and parallel to the weighbeam 9 and is complementally received in the groove 20, the support 11 having the spaced abutment formation shown in Fig. 1 for limiting sliding movement.

The weighbeam 9 fulcrums about a knife-edge bearing which consists of a knife 21, which is located on knife rest 22 carried by a fixed block 23. If the check-links 12 and 13 are inaccurately finished, or spaces exist in the fulcrums of the check-links 12 and 13 due to wear and tear or the like, and the platform or platter 10 is loaded off its center, then the support 11 will be displaced over a small distance in a direction transversely of the longitudinal axes of the knife-edge bearings 19 and 21 by a push or pull acting through the lower link 13, the particular direction depending on which side of the center of the platter the loading takes place. This displacement varies in accordance with the distance of the load from the middle of the platter.

By this arrangement, the knife 19 is prevented from sliding out of its rest 18; in other words, the knife and its rest will remain in true working relationship to each other. Sliding out action would certainly occur if the rest 18 were connected to the support 11 in the usual manner.

The weighbeam 9, Fig. 3, is adjustable in a direction transverse to the axes of the knife-edge bearings by virtue of sliding movement of the knife 24 along a flat knife rest 25 which constitutes an adjustment device. In Fig. 4, the knife rest 26 is pivotally connected at 26A to the platter support 11, said pivotal connection 26A constituting the adjustment device. In Fig. 5, the main bearing 27 is displaceable on rollers 28 which constitute the adjustment device. Fig. 6 is similar to Fig. 5, but with the difference that the lower link 13 is connected at 29 to the weighbeam 9 instead of to the platter support 11.

All of the foregoing embodiments have in view the automatic adjustment of the weighbeam, or the platter support, in the event of corner loading when there is space in the fulcrums of the links, or when there is incorrect adjustment of the links.

Although the embodiments shown in the drawings are concerned with weighing apparatus having a fan-shaped indicating chart, nevertheless it will be clear that the invention is applicable to other known types of apparatus.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A weighing scale comprising a movable support for a weighing platter, a weighbeam, a knife-edge bearing and a bearing seat between said support and said weighbeam, said support and said bearing seat having complementally interfitting groove and slide formations arranged for relative sliding movement in a direction transverse of the longitudinal axis of the knife-edge bearing, and check link means connected to said support to control its movement.

2. A weighing scale comprising a movable support for a weighing platter, a weighbeam, a knife-edge bearing and a bearing seat between said support and said weighbeam, said support being formed with an edge portion extending above and parallel to said weighbeam, and said bearing seat having a groove complementally receiving the said edge portion of the support for relative sliding movement in a direction transverse of the longitudinal axis of the knife-edge bearing, and check link means connected to said support to control its movement.

3. A weighing scale comprising a movable support for a weighing platter, a weighbeam, a knife-edge bearing and a bearing seat between said support and said weighbeam, said support being formed with a portion having a rounded edge extending above and parallel to said weighbeam and an abutment at each end of the rounded edge, and said bearing seat having a groove complementally receiving the rounded edge of the support for relative sliding movement in a direction transverse of the longitudinal axis of the knife-edge bearing, and check link means connected to said support to control its movement.

4. A weighing scale comprising a movable support for a weighing platter, a weighbeam, a knife-edge bearing member and a bearing seat member disposed between said support and said weighbeam, with the bearing member carried by one and the seat member by the other, said support and the member carried by it having complementally interfitting groove and slide formations arranged for relative sliding movement in a direction transverse of the longitudinal axis of the knife-edge bearing, and check link means connected to said support to control its movement.

ADRIANUS van DUYN.

REFERENCES CITED

The following references are of record in the file of this patent:

UNITED STATES PATENTS

| Number | Name | Date |
|---|---|---|
| 751,018 | Selley | Feb. 2, 1904 |
| 901,994 | Ostendorf | Oct. 27, 1908 |
| 924,962 | Boling | June 15, 1909 |
| 1,032,439 | Templeton | July 6, 1913 |
| 1,229,449 | Hapgood | June 12, 1917 |
| 1,706,977 | Hurt | Mar. 26, 1929 |
| 2,159,684 | Bennett | May 23, 1939 |

FOREIGN PATENTS

| Number | Country | Date |
|---|---|---|
| 69,315 | Germany | June 19, 1893 |